Figure 1:
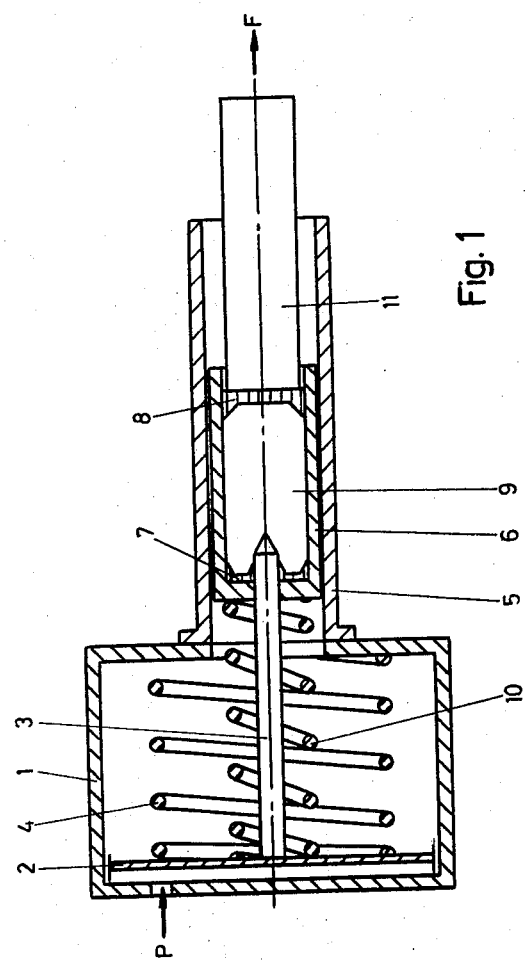

United States Patent [19]  
Severinsson

[11] 3,830,061  
[45] Aug. 20, 1974

[54] FORCE-TRANSMITTING DEVICE
[75] Inventor: Lars Mattis Severinsson, Malmo, Sweden
[73] Assignee: Svenska Aktienbolaget Bromsregulator, Malmo, Sweden
[22] Filed: Sept. 14, 1973
[21] Appl. No.: 397,435

[30] Foreign Application Priority Data
Sept. 21, 1972 Great Britain.................... 43716/72

[52] U.S. Cl...................... 60/533, 60/568, 60/593, 188/348
[51] Int. Cl............................................. F15b 7/00
[58] Field of Search........ 74/581, 583; 60/593, 583, 60/568, 547, 533; 188/347, 348

[56] References Cited
UNITED STATES PATENTS
1,581,057  4/1916  Hill.................................. 60/583 X
1,796,687  3/1931  Esnault-Pelterie.................... 74/581
3,183,672  5/1965  Morgan............................. 60/593 X
3,490,233  1/1970  Okonski.............................. 60/583

Primary Examiner—Samuel Scott
Assistant Examiner—F. D. Shoemaker
Attorney, Agent, or Firm—Laurence R. Brown

[57] ABSTRACT

A force-transmitting device moves a rod into a compressible medium in an expandable cylindrical casing moving axially within a tube to deliver a force upon movement into contact with a load so that when the casing encounters a load the medium expands the casing and frictionally clamps it within the tube.

4 Claims, 8 Drawing Figures

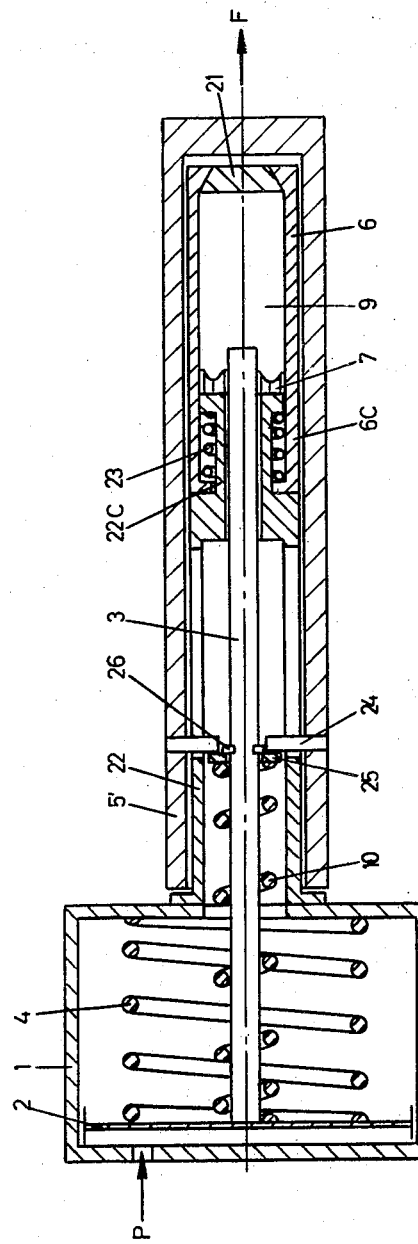

3,830,061

FORCE-TRANSMITTING DEVICE

This invention relates to force-transmitting devices.

Devices for transmitting mechanical forces are often incorporated in or associated with force-exerting assemblages whereby forces can be exerted for actuating mechanical arrangements, for example vehicle wheel brake arrangements.

Such a force-exerting assemblage may include a force-generating device which receives energy, for example from compressed air or other pressure fluid, and generates mechanical force. The assemblage may also include a force-transmitting deivce whereby the said mechanical force is transmitted to a force-delivering means, the latter being included in the assemblage and serving to deliver the force to a mechanical arrangement to be actuated by the force.

It is frequently desirable that in the rest condition there should be some distance between the mechanical arrangement and the force-delivering means, but it is then necessary for the assemblage to make a "lost-motion" or application stroke to move the force-delivering means through the said distance into engagement with a part of the mechanical arrangement so that the force can be delivered. A force-generating device in the form of a simple fluid-actuated cylinder-piston unit can effect a fast and long "lost-motion" or application stroke, but in many instances it will deliver a force which is too small. Therefore it is often necessary to provide a force-transmitting device which increases the force but decreases the distance through which the force is exerted. The most usual force-transmitting device is a leverage system, but in many cases this is inconvenient because of its volume and weight and also because it involves the loss of a fast and long "lost-motion" or application stroke.

The invention is therefore intended to provide a force-transmitting device that can be compact and lightweight and that can be employed in a force-exerting assemblage giving a long and fast application stroke followed by an increased force after a force-delivering means has made contact with a force-receiving part of a mechanical arrangement.

According to the invention there is provided a force-transmitting device comprising the combination of the following substantially coaxially arranged elements: a tube, a radially-expandable casing, which is axially movable in its unexpanded condition in the tube and contains an enclosed plastically deformable force-transmitting medium; a force-introducing rod acting on the medium; a force-delivering means acted on by the medium; and an application means acting in the force-introducing direction for relative displacement of the tube and the casing until the occurence of a counter-force on the force-delivering means sufficient to cause radial expansion of the casing and frictional locking of the casing in the tube due to increased pressure in the medium.

One embodiment of the invention is characterised in that the tube is attached to a fluid-actuated cylinder-piston unit with a piston rod constituting the said force-introducing rod, that the said application means is a helical compression spring coaxial with the rod and acted on by the piston, and also that the force-delivering means is a plunger at the end of the casing facing away from the piston.

A second embodiment of the invention is characterised in that the casing is axially movably guided at the end of a cylindrical part attached to a fluid-actuated cylinder-piston unit with a piston rod constituting the said force-introducing rod, that the application means is a helical compression application spring coaxial with the rod and acted on by the piston and also that the force-delivering means is constituted by the tube, guided for axial movement on the said cylindrical part, which has substantially the same cross-sectional shape and dimensions as the casing.

These two embodiments have the common advantage of facilitating incorporation of the force-generating device and force-transmitting device and force-delivering means in a force-exerting assemblage which allows a compact and lightweight construction.

Such force-exerting assemblages can be used in many technical fields. The most important use is perhaps as brake actuators for vehicles, especially railway vehicles but also road vehicles. Other interesting uses are as actuators for hub-pullers or the like, for clamping and tightening devices, and also for riveting, punching and cutting machines.

In a device according to the first above-mentioned embodiment the application spring can be arranged between the piston and the casing, if a very simple device is desirable. There is however often a demand for a force-exerting assemblage to be of the shortest possible length, in which case the force-delivering plunger is hollow and receives the free end of the rod, which extends axially through the casing and is provided with a step within the casing, and the application spring is provided between a pin in the said free end of the rod and an inwardly-directed flange on an axial prolongation of the casing at the end thereof facing from the piston.

In order to avoid useless compression of the application spring detracting from the available force (as a loss of energy) during the force-delivering, there can be provided an application clutch automatically avoiding further stressing of the application spring after sufficient movement of the rod relative to the radially-expandable casing during a force-exerting operation. Such an application clutch can be provided regardless of the location of the application spring relative to the said casing.

In a device according to the second above-mentioned embodiment the application spring may be arranged between the piston and an inwardly-directed projection on the tube.

Figures 2, 3:
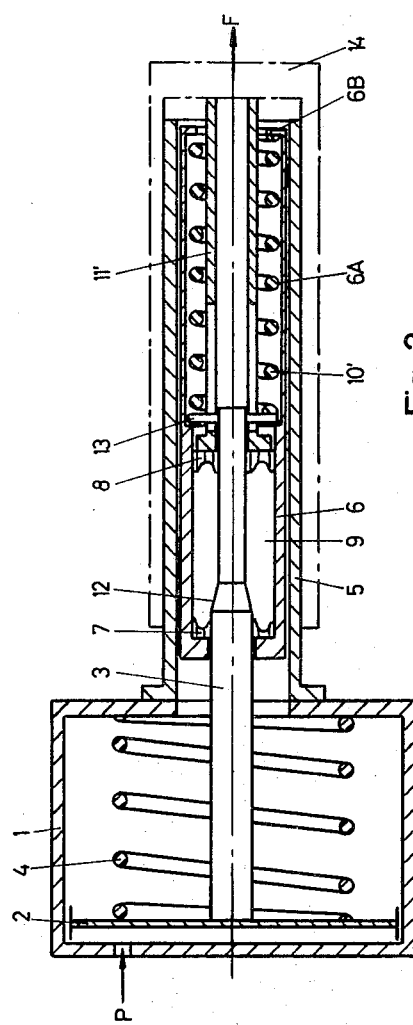
Figure 5:
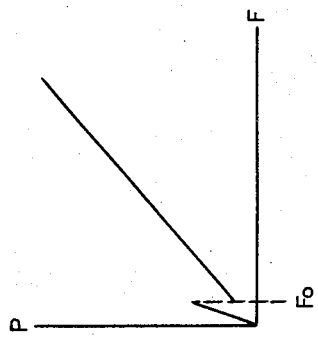
Figure 7:
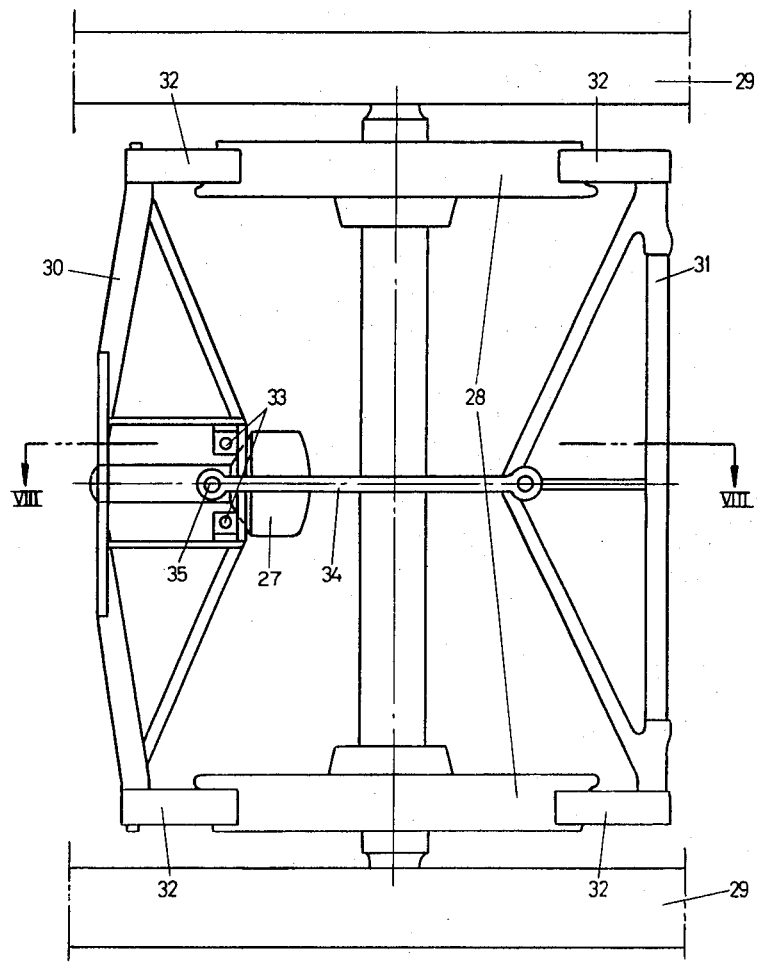
Figure 8:
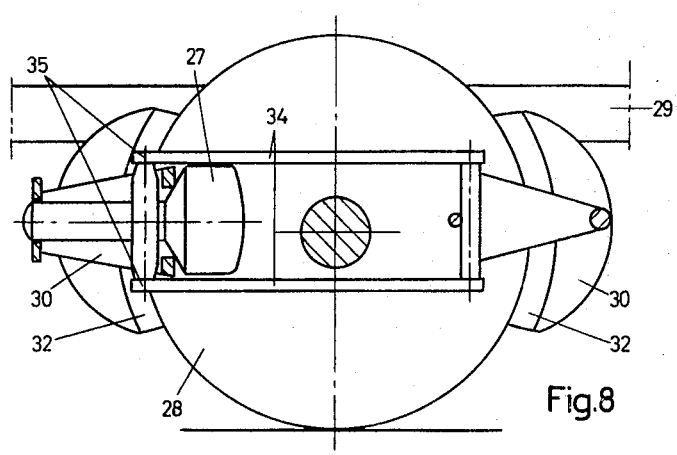

How the invention can be put into practice is described in further detail with reference to the accompanying drawings which show examples of embodiments of the invention and of an example of an installation, and in which FIG. 1 is a lateral view, partly in section, of a force-exerting assemblage incorporating a first embodiment of the invention, FIG. 2 is a corresponding view of an assemblage incorporating a second embodiment, FIG. 3 is a graph of the output force as a function of the input pressure with the embodiments according to FIGS. 1 and 2, FIG. 4 corresponds to FIG. 1 and 2 but shows a third embodiment, FIG. 5 corresponds to FIG. 3 but relates to the embodiment according to FIG. 4, FIG. 6 corresponds to FIGS. 1, 2 and 4 but shows a fourth embodiment, FIG. 7 is a top view of a brake arrangement with a brake actuator according to any of the said four embodiments, and FIG. 8 is a section substantially on the line VIII—VIII of FIG. 7.

FIG. 1 shows a simple assemblage which may be regarded as functionally incorporating a force-generating device, a force-transmitting device, and force-delivering means.

The force-generating device in this first assemblage is a fluid-actuated cylinder-piston unit comprising a cylinder 1, a piston 2, a piston rod 3 and a helical compression return spring 4. Fluid, for example compressed air, can be delivered to the unit under a pressure P.

The force-transmitting device is in accordance with the present invention and comprises a tube 5 attached to the cylinder 1, a radially-expandable casing 6 with sealing means 7 and 8 at its respective ends and containing an enclosed plastically deformable force-transmitting medium 9. In its unexpanded condition the casing 6 is axially movable in the tube 5. The piston rod 3 of the force-generating cylinder-piston unit extends through the sealing means 7 and acts on the medium 9 as a force-introducing rod, whereas an application means in the form of a compression helically-wound application spring 10 is arranged between the piston 2 and the casing 6 and applies to the casing 6 a force derived from the piston 2.

In this instance the force-delivering means is simply constituted by a plunger 11 at the end of the casing facing from the piston and acted on by force from the medium 9 through the sealing means 8 which is axially slideable in the casing 6. The plunger 11 is intended for delivering a force F to an appropriate force-receiving part (not shown) of a mechanical arrangement or system; this part is substantially stationary in the direction of movement of the plunger 11 after a movement during which the force delivered to this part rises to a maximum.

The assemblage of FIG. 1 functions as follows: In its rest position the plunger 11 is spaced at some distance from the said force-receiving part (not shown) and must initially be moved to be applied to this part. When fluid is introduced into the cylinder 1 so as to act on the piston 2 force will be transmitted from the piston to the casing 6 through the application spring 10. The result is that the casing 6, which is in its unexpanded condition, is moved to the right as viewed in FIG. 1, (which direction can be defined as the forward direction) until the plunger 11 engages the said force-receiving part (not shown). Thus through the plunger 11 and the sealing means 8 a counter-force will now be applied to the medium 9. Further forward movement of the piston 2 will cause the rod 3 to be pushed into the medium 9 in the casing 6 and the latter will expand and be locked in the tube 5. Forces now delivered by the rod 3 will be transmitted by the medium 9 to the plunger 11 and thus to the said force-receiving part (not shown). The ratio of the force F in the plunger 11 to the force in the rod 3 is as the ratio between the cross-sectional areas of the sealing means 8 of the plunger 11 and the rod 3 in the medium 9.

Summarizing, it is evident that the movement leading to the application of the plunger 11 to the said force-receiving part (not shown) takes place with the same speed as the movement of the piston 2, whereas it is possible to obtain the desired force F from the plunger 11 by choosing a suitable area ratio between the sealing means 8 of the plunger 11 and the rod 3 in the force-transmitting medium 9.

In a modification in which the plunger 11 extends through the sealing means 8 (as the rod 3 extends through the sealing means 7) the ratio of the force in the rod 3 to the force in the plunger 11 depends upon the cross-sectional areas of the rod 3 and the plunger 11 in the medium 9, which is preferably an easily-deformable polymer having a high bulk modulus.

It is to be noted that although the application means in this case is in the form of a helical compression spring 10 this means can have some other constructional form and still perform its function of moving the casing 6 and thus the plunger 11 forward under the influence of the movement of the piston 2 prior to the plunger 11 meeting external resistance.

FIG. 2 shows an assemblage incorporating a second embodiment of the invention, and like parts as in the assemblage according to FIG. 1 have like reference numerals. The following parts can thus be found in both FIGS. 1 and 2: the cylinder 1, the piston 2, the piston 3, the return spring 4, the tube 5, the expandable casing 6, the sealing means 7 and 8, and the medium 9. In this case the rod 3 extends axially completely through the casing 6 and is provided with a step 12 therein, and the rod 3 extends through the sealing means 8, the latter being annular. The force-delivering plunger 11' in this instance is hollow and receives the "free" end of the rod 3. This "free" end is provided with a transverse pin 13, whereas the casing 6 is provided with an axial prolongation 6A. Between an inwardly-directed flange 6B on this prolongation 6A and the said pin 13 (protruding through a slot in the hollow plunger 11') is an application spring 10'. It is possible to arrange (as indicated in dash-dotted lines) a force-delivering housing 14 slidable on the tube 5 for concealing the force-transmitting device. The manner of functioning of this second embodiment is substantially similar to that of the first embodiment. In this instance the force F is determined by the ratio between the area of the sealing means 8 of the plunger 11' acted on by the medium 9 and the effective area of the step 12 acting on the medium 9.

An advantage of this arrangement with the application spring 10' in front of the casing 6 is that it enables a shorter overall length of the assemblage with a particular length of application stroke than the arrangement according to FIG. 1.

The relation between the fluid pressure P and the delivered force F for the assemblages of FIGS. 1 and 2 is illustrated (not to scale) in FIG. 3 which is a graph in which the pressure P is plotted vertically against the delivered force F plotted horizontally. It can be seen that the pressure P rises to a value $P_o$ and the force F rises to a value $F_o$ during the application stroke prior to the plunger encountering resistance. Thereafter the inclination of the graph line is smaller, and an extension of this portion of the line does not pass through origo, which means that a part of the available force is lost due to the effect of the application spring after completion of the application stroke.

By providing an application clutch for the application spring (as described in detail below with reference to FIG. 4) it is possible to obviate this drawback and to utilize the whole force available from the piston 2. The effect of the introduction of such an application clutch is illustrated in FIG. 5 where it can be seen that the relation between the pressure P and the force F is the same as in FIG. 3 during the application and thus up to the force $F_o$ where the application clutch disengages the application spring, whereafter the whole available force is utilized and the line goes through origo; it is also to be noted that the inclination of the graph line is greater as no force is lost in useless compression of the application spring.

Figure 4:
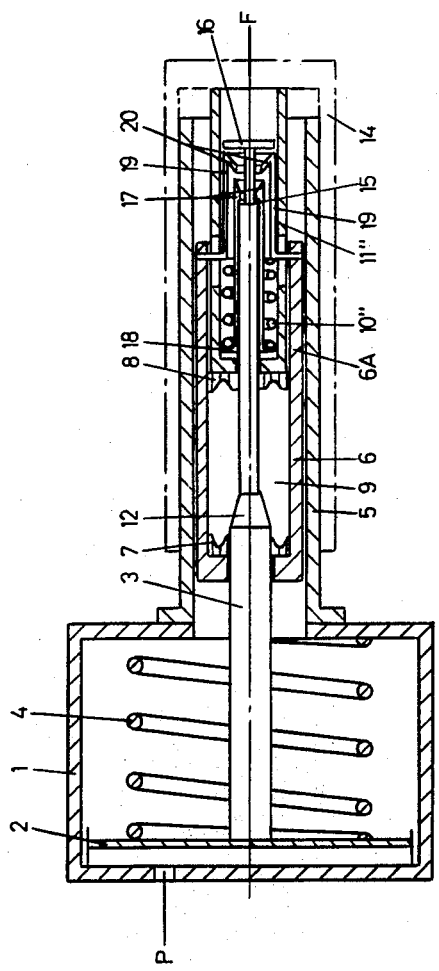

FIG. 4 shows an assemblage with a third embodiment of the invention in which there is provided an application clutch and which is in most respect otherwise similar to the embodiment according to FIG. 2. Like reference numerals are used for like parts in both embodiments, but it should be noted that the application spring in this case has the numeral 10" and the plunger has the numeral 11", and only parts differing from the embodiment according to FIG. 2 will be described further with reference to FIG. 4, i.e. especially the application clutch.

The rod 3, near its end facing away from the piston 2, is provided with a shoulder 15 and the rod 3 terminates in a return plate 16. Co-acting with the shoulder 15 are claws 17 which are placed around the rod 3 and at their ends facing to the casing 6 are joined in an outwardly-directed flange 18. The claws 17 are spring-biassed to engagement with the shoulder 15 as shown in FIG. 4.

The prolongation 6A of the casing 6 is provided with arms 19 which as shown extend into the hollow plunger 11" and forward parallel to the rod 3 and terminate in inwardly and rearwardly bent fingers 20 for co-action with sloping surfaces on the claws 17.

The application spring 10" is arranged between the flange 18 and the inwardly-directed part of the arms 19.

The functioning of the assemblage of FIG. 4 is as follows: when the piston 2 is moved forward during an application stroke the force is transmitted through the rod 3, the claws 17, the flange 18 and the application spring 10" to the inwardly-directed parts of the arms 19 and thus to the casing 6, which is moved forward until a counter-force on the plunger 11" causes the casing 6 to expand and be locked in the tube 5 under continued forward movement of the rod 3. Such movement will cause the claws 17 to reach the fingers 20. The co-acting surfaces of these parts 17 and 20 are so formed that the claws 17 will move outwardly and leave the shoulder 15, which means that the rod 3 can move without causing further compression of the application spring 10" and that the whole available force will be transmitted to the plunger 11" as discussed above with reference to FIG. 5.

During the return stroke the return plate 16 will act on the arms 19 and thus on the casing 6.

It is to be noted that an application clutch of the described or similar type can be provided also in an assemblage according to FIG. 1, i.e. between the piston 2 and the casing 6 in place of the simple spring 10.

In FIG. 6 there is shown an assemblage comprising a cylinder 1 in which a fluid-actuated piston 2 is movable and is loaded by a return spring 4. The piston 2 is provided with a piston rod 3 extending into an axially-expandable casing 6 filled with a deformable polymer or other force-transmitting medium 9. There is a sealing means 7 around the rod 3 in the casing 6, whereas the other end of the casing 6 has a closure 21.

To the cylinder 1 there is attached a cylindrical part 22 with substantially the same cross-sectional shape and dimensions as the casing 6. The casing 6 is provided with a prolongation 6C (to the left as viewed in FIG. 6) with an inwardly-directed flange, whereas the cylindrical part 22 has a prolongation 22C to the right smaller in diameter than the casing prolongation 6C. The prolongation 22C has an outwardly-directed flange. The casing 6 is thus guided for axial movement at the end of the cylindrical part 22 as shown in FIG. 6. These two parts are kept apart at rest by a helical compression spring 23.

Around the cylindrical part 22 and the casing 6 there is provided an axially movable tube 5' (which as shown is closed at its free end). This tube 5' is the force-delivering device in this instance and acts on a force-receiving part (not shown) with a force F when fluid under a pressure P acts on the piston 2.

The tube 5' is provided with an inwardly-directed projection 24 extending through a slot in the cylindrical part 22. An application spring 10 is arranged between the piston 2 and the projection 24 and acts on the latter through a ring 25. A washer 26 is attached to the rod 3 and acts on the application spring 10 through the ring 25 during the return stroke.

The application means or spring can have an application clutch of the type shown in FIG. 4 or any other suitable type.

During the application stroke the tube 5' will be moved forward to a greater extent than the casing 6 owing to the relatively small movement of the rod 3 in relation to the casing 6 having regard to the volume of the medium 9 therein. When a counterforce begins to act on the tube 5' the casing 6 will expand and will be locked to the tube 5' so that further movement of the piston 2 and the rod 3 will have the effect of moving the casing 6 and the tube 5' forward together. The transmitted or delivered force F depends on the ratio between the effective area of the end of the cylindrical part prolongation 22C or sealing means 7 exposed to the pressure in the medium 9 and cross-sectional area of the rod 3 likewise exposed.

A proposal for the practical use of an assemblage incorporating a force-transmitting device according to the invention is shown in FIGS. 7 and 8. A brake-actuator 27 includes a force-transmitting device according to the invention, for example according to any of the embodiments shown in FIGS. 1, 2, 4 and 6. This brake-actuator 27 is intended for brakes to act on vehicle wheels 28, shown as wheels of a railway vehicle. These wheels 28 are rotatably supported in an underframe 29 of the vehicle. Two brake-beams 30 and 31 carry brake-shoes 32 arranged for acting on the wheels 28. One brake-beam 30 is attached to the cylinder of the brake-actuator at 33, whereas the other brake-beam 31 is connected at 35, to the force-delivering device of the brake-actuator 27 through connecting rods 34. The brake-actuator 27 will thus rapidly apply the brake-shoes 32 to the wheels 28 with the force-transmitting casing 6 free in the brake-actuator tube 5 (FIG. 1). After the brake-shoes 32 are applied to the wheels 28 the casing 6 will expand and make possible a larger force than would be possible with a direct force transmission and without any mechanical leverage. The force in the rods 34 is of course a tensile force. It should be noted that the brake-actuator 27 in this instance must be provided with a slack adjuster to compensate for brake-shoe wear.

Many modifications are of course possible within the scope of the appended claims, and it is to be noted that the described and illustrated embodiments only are examples.

What we claim is:

1. A force-transmitting device comprising in combination a tube, a radial expandable casing coaxially arranged within said tube for axial movement therein in its unexpanded condition, said casing enclosing a plastically deformable force-transmitting medium, a force-introducing rod extending within said casing to deform said movable medium, force-delivering means coupled to said medium to receive and deliver force from said rod through said medium, and motion transferring means moving said casing within said tube to a position such that the force between said rod and said force-delivering means expands said casing by deforming said medium to frictionally lock said casing in said tube.

2. A device according to claim 1 including a piston coupled to move said rod into said medium, and wherein the motion transferring means comprises a helical compression spring coaxial with said rod and extended between said piston and said casing to compress with movement of said piston and provide a force tending to move said casing along said tube.

3. A device according to claim 1, wherein said movable force delivering means is a hollow plunger, and said rod extends axially through said casing into said plunger and presents a step located within said casing of larger dimension.

4. A device according to claim 1 including a clutch operating to limit the stroke of movement of said motion transferring means.

* * * * *